Dec. 14, 1926.
P. H. RUTHERFORD
ALTERNATING CURRENT MOTOR
Filed Feb. 9, 1925
1,610,816
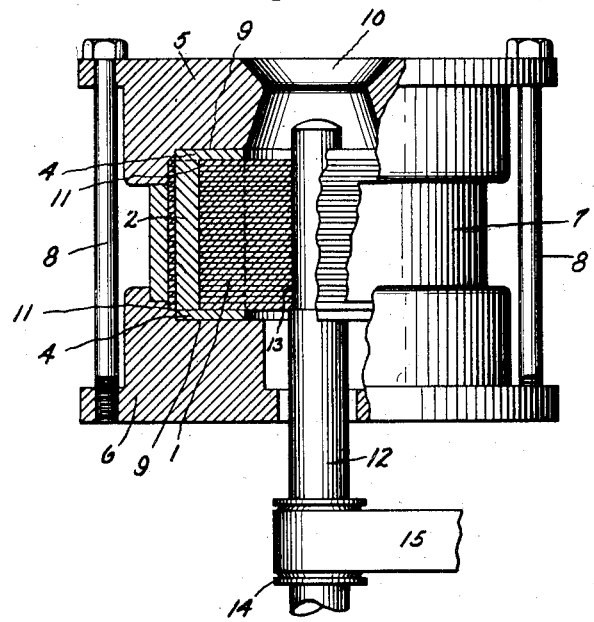
Fig. 1.
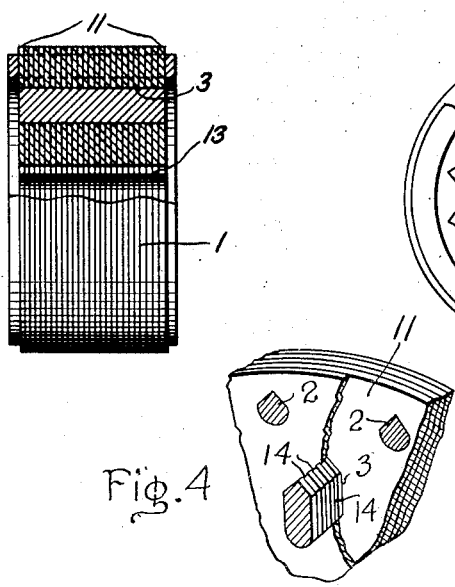
Fig. 2.
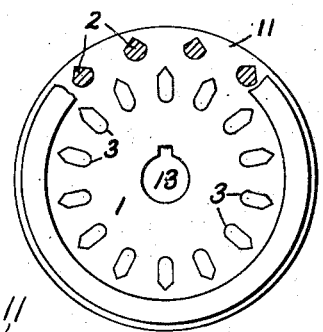
Fig. 3.
Fig. 4.
Inventor:
Paul H. Rutherford,
by
His Attorney.

Patented Dec. 14, 1926.

1,610,816

UNITED STATES PATENT OFFICE.

PAUL H. RUTHERFORD, OF LYNN, MASSACHUSETTS, ASSIGNOR TO GENERAL ELECTRIC COMPANY, A CORPORATION OF NEW YORK.

ALTERNATING-CURRENT MOTOR.

Application filed February 9, 1925. Serial No. 7,802.

My invention relates to alternating current motors and particularly to squirrel cage rotors of such motors and to a method of making such rotors.

It has been the practice heretofore to provide the laminated rotors of alternating current motors with squirrel cage windings made of cast metal, the end rings of the windings being located up against the end laminations. In the operation of such a motor, the conductors of the winding become heated and again cooled, resulting in large stresses in the conductors due to the warping of the punchings as they cool unequally. Cast metal will not stand much stress, and consequently, very frequently the tension caused by the warping of the punchings breaks the conductors.

My invention has for its object a novel construction of such rotors, whereby the breaking of such conductors is prevented. To this end, I provide the laminations forming the rotor with a set of openings located away from the periphery of the rotor and separate and distinct from the conductor receiving openings, and place in these openings, cast metal members having irregularities throughout their length, said irregularities engaging said laminations to clamp them together. These members are not provided with end rings and are preferably located deep enough in the laminations so that very little, if any, flux links them. They, therefore, will have practically no current generated in them and consequently will not heat up. These members will therefore take nearly all the tension due to the warping of the laminations and the conductors will be free to expand and contract without substantially any external stress. These members and the conductors will divide the load of holding the punchings together inversely proportional to the amount of their expansion.

My invention also has for its object a novel method of forming such a rotor.

Other features of novelty which characterize my invention are pointed out with particularity in the claims annexed to and forming a part of this specification. For a better understanding of my invention, reference may be had to the following description taken in connection with the accompanying drawing, in which Fig. 1 is a view, partly in section of a mold and a rotor, the rotor representing its condition after the first step of my new method has been completed; Fig. 2 is a view, partly in section, of my new rotor; Fig. 3 is an end view of the rotor of Fig. 2, and Fig. 4 is an enlarged perspective view of a portion of the rotor, with parts broken away.

In the drawing, I have shown my invention applied to the rotor of an induction motor, the core 1 of which is formed of laminations having a set of longitudinally extending conductor receiving openings 2 located near the periphery of the rotor and a set of longitudinally extending openings 3 located away from the periphery of the rotor. The openings 3 are separate and distinct from the openings 2 and are preferably larger in cross-section than the openings 2. In order to cast a squirrel cage winding in the conductor receiving openings 2 and metal members in the openings 3, the core 1 is placed in a suitable mold formed in such a manner that the openings 2 and 3 will be entirely filled with metal, united and integral at each end with a single end ring 4. I, then, by a suitable tool, interrupt the continuity of the portion of the metal end rings at the ends of the core adjacent the set of openings 3, preferably by cutting away this portion of the end rings so that the ends of the members formed therein are substantially flush with the ends of the core 1. The members formed in the openings 2 and the remainder of the end rings 4 form a squirrel cage winding. As pointed out hereinafter, the members formed in the openings 3 have irregularities throughout their length, these irregularities engaging the laminations to clamp them together.

In the casting operation, I preferably employ a mold comprising end flange portions 5 and a cylindrical portion 7. The cylindrical portion embraces the outer periphery of the core member and the flange portions 5 and 6 are fastened together as by bolts 8 so as to firmly clamp together the laminations forming the magnetic core 1. These flange portions engage the laminations at their outer periphery and each is cut away so as to have formed therein a groove 9. The flange 5 has an opening 10 therein through which molten metal may be poured to form metal members in the openings 2 and 3 in the core and end rings 4 in the grooves 9, the end rings being close up against the end laminations 11 of the core.

The casting operation may be done by any suitable method. I have chosen to illustrate the centrifugal method of the Reist and Maxwell Patent No. 1,190,009, dated July 4, 1916. The mold and core are rotated as a unit in any suitable manner. For this purpose, there is shown a mandrel 12 fastened in the shaft receiving opening 13 of the core 1, the mandrel having mounted thereon a pulley 14, the whole being rotated by means of a belt 15. While the core and mold are being rotated, metal is poured through the opening 10 of the flange 5. This metal flows down the large openings 3 and also partially down the openings 2. Some of the metal after flowing through the openings 3, also flows up the openings 2 uniting with the metal which flows down these openings. Molten metal also fills the grooves 9 forming end rings, one at each end of the rotor. Sufficient metal is poured into the mold to form the members in the openings 2 and 3 and end rings in grooves 9. Rotation of the mold and core is continued until the molten metal has congealed. When the mold and parts are sufficiently cool to handle, the bolts 8 are removed, thereby permitting the parts 5, 6 and 7 of the mold to be removed. After the rotor is removed from the mold, the portion of the end rings 4 adjacent the members formed in the openings 3, are machined away in any suitable machine tool, so that the members formed in these openings are substantially flush with the ends of the core, that is, flush with the end laminations 11. These members act to clamp the laminations together and relieve the stress on the members formed in the openings 2. The end rings remaining are integrally connected to members formed in the openings 2 and form with these members or conductors, a squirrel cage winding, as shown in Figs. 2 and 3.

The members formed in the openings 3 are preferably located sufficiently deep in the iron of the core 1, so that very little, if any, flux links them. They, therefore, will be electrically independent of each other, that is, they have practically no current passing through them. The openings, in which they are cast, are not smooth, but have slight irregularities due to the fact that the openings are punched out of the laminations. When these members are cast, some of the molten metal enters between the laminations adjacent to these openings and into the irregularities caused by the punching operation and consequently these members have corresponding irregularities throughout their length. These irregularities are shown at 14, in Fig. 4. These irregularities engage the laminations to clamp them together and relieve the stress on the conductor members formed in the openings 2.

The members cast in the openings 3 and the squirrel cage winding are preferably cast out of aluminum, but any other suitable metal may be used.

What I claim as new and desire to secure by Letters Patent of the United States is:

1. In an alternating current motor, a rotor comprising laminations, said laminations being provided with longitudinally extending conductor receiving openings located near the periphery of said rotor and a set of longitudinally extending openings located away from the periphery of said rotor, said last mentioned openings being separate and distinct from said first mentioned openings, conductors in said conductor receiving openings, end rings integrally formed with said conductors to form a squirrel cage winding, and a plurality of cast metal members distinct from one another in said openings away from said periphery, said members having irregularities throughout their length, said irregularities engaging said laminations to clamp them together and relieve the stress on said conductors.

2. In an alternating current motor, a rotor comprising laminations, said laminations being provided with longitudinally extending conductor receiving openings located near the periphery of said rotor and a set of longitudinally extending openings located away from the periphery of said rotor, said last mentioned openings being separate and distinct from said first mentioned openings, conductors in said conductor receiving openings, end rings integrally formed with said conductors to form a squirrel cage winding, and a plurality of cast metal members electrically independent and distinct from one another in said openings away from said periphery, the ends of said members being substantially flush with the end laminations and clamping said laminations to relieve the stress on said conductors.

3. In an alternating current motor, a rotor comprising laminations, said laminations being provided with longitudinally extending conductor receiving openings located near the periphery of said rotor and a set of longitudinally extending openings located away from the periphery of said rotor, said last mentioned openings being larger in cross-section than and separate and distinct from said first mentioned openings, conductors in said conductor receiving openings, end rings integrally formed with said conductors to form a squirrel cage winding, and a plurality of cast metal members distinct from one another in said openings away from said periphery, said members having irregularities throughout their length, said irregularities engaging said laminations to clamp them together and relieve the stress on said conductors.

4. In an alternating current motor, a rotor comprising laminations, said laminations being provided with longitudinally extending conductor receiving openings located near the periphery of said rotor and a set of longitudinally extending openings located away from the periphery of said rotor, said last mentioned openings being larger in cross-section than and separate and distinct from said first mentioned openings, conductors in said conductor receiving openings, end rings integrally formed with said conductors to form a squirrel cage winding, and a plurality of cast metal members electrically independent and distinct from one another in said openings away from said periphery, the ends of said members being substantially flush with the end laminations and clamping said laminations to relieve the stress on said conductors.

5. The method of forming a rotor of an alternating current motor comprising a laminated core having a set of longitudinally extending conductor receiving openings located near the periphery of said rotor and a set of longitudinally extending openings located away from the periphery of said rotor and separate and distinct from the first mentioned openings, which consists in casting metal members in both of said sets of openings and metal end rings at the ends of said core integral with the metal in said openings, and thereafter removing the portion of the metal end rings at the ends of the core adjacent said set of openings located away from the periphery of the rotor, so that the ends of the members formed therein are substantially flush with the ends of the core and clamp said laminations together, the members formed in the set of openings near the periphery of the rotor and the remainder of the metal end rings forming a squirrel cage winding.

In witness whereof, I have hereunto set my hand this fifth day of February, 1925.

PAUL H. RUTHERFORD.